United States Patent
Grzesiak et al.

(10) Patent No.: US 11,997,326 B2
(45) Date of Patent: May 28, 2024

(54) METHOD OF STREAMING IMAGE CONTENT BETWEEN SERVER AND ELECTRONIC DEVICE, SERVER FOR STREAMING IMAGE CONTENT, AND ELECTRONIC DEVICE FOR STREAMING IMAGE CONTENT

(71) Applicant: SAMSUNG ELECTRONICS CO., LTD., Suwon-si (KR)

(72) Inventors: Grzegorz Pawel Grzesiak, Warsaw (PL); Myungjoo Ham, Seoul (KR); Pawel Wasowski, Warsaw (PL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/074,878

(22) Filed: Dec. 5, 2022

(65) Prior Publication Data
US 2023/0171444 A1 Jun. 1, 2023

Related U.S. Application Data

(63) Continuation of application No. PCT/KR2022/018762, filed on Nov. 24, 2022.

(30) Foreign Application Priority Data

Nov. 30, 2021 (KR) .......................... 10-2021-0169438

(51) Int. Cl.
*H04N 21/235* (2011.01)
(52) U.S. Cl.
CPC ............................ *H04N 21/2353* (2013.01)
(58) Field of Classification Search
CPC ......... H04N 21/2353; H04N 21/23406; H04N 21/23412; H04N 21/23418;
(Continued)

(56) References Cited

U.S. PATENT DOCUMENTS 9,600,860 B2   3/2017   Perez Pellitero et al.
9,700,789 B2   7/2017   Cotter
(Continued)

FOREIGN PATENT DOCUMENTS

CN   110996125 A   4/2020
EP   3 493 149 A1   6/2019
(Continued)

OTHER PUBLICATIONS

International Search Report & Written Opinion (PCT/ISA/220, PCT/ISA/210 & PCT/ISA/237) dated Mar. 15, 2023 by the International Searching Authority in International Patent Application No. PCT/KR2022/018762.

(Continued)

*Primary Examiner* — Dominic D Saltarelli
(74) *Attorney, Agent, or Firm* — Sughrue Mion, PLLC

(57) ABSTRACT

A method, performed by a server, of streaming image content, including obtaining one or more frames of the image content which is currently being executed by an electronic device; identifying a plurality of possible user inputs corresponding to the one or more frames; generating a plurality of prediction frame sets respectively corresponding to the plurality of possible user inputs, wherein each prediction frame set of the plurality of prediction frame sets includes a plurality of prediction frames to be displayed after the one or more frames; obtaining metadata from the one or more frames and the plurality of prediction frame sets; generating streaming data of the image content to be provided to the electronic device, based on at least one the plurality of prediction frame sets or the metadata; and transmitting the generated streaming data to the electronic device.

16 Claims, 12 Drawing Sheets

(58) Field of Classification Search
CPC ....... H04N 21/2343; H04N 21/234345; H04N 21/23439; H04N 21/2387; H04N 21/2393
USPC ..................................................... 725/116
See application file for complete search history.

(56) References Cited

U.S. PATENT DOCUMENTS

| | | | |
|---|---|---|---|
| 9,770,657 | B2 | 9/2017 | Perlman et al. |
| 10,076,711 | B2 | 9/2018 | Malenfant |
| 10,306,180 | B2 | 5/2019 | McLoughlin et al. |
| 10,369,465 | B2 | 8/2019 | Perlman et al. |
| 10,582,205 | B2 | 3/2020 | Wang et al. |
| 10,867,586 | B1* | 12/2020 | Radjabli .............. H04N 21/466 |
| 10,885,341 | B2 | 1/2021 | Chen et al. |
| 11,338,199 | B2 | 5/2022 | Hwang et al. |
| 2015/0296215 | A1 | 10/2015 | Callahan |
| 2018/0075581 | A1 | 3/2018 | Shi et al. |
| 2018/0115743 | A1 | 4/2018 | McLoughlin et al. |
| 2019/0364302 | A1 | 11/2019 | Perlman et al. |
| 2020/0196024 | A1* | 6/2020 | Hwang .............. H04N 21/2353 |
| 2020/0206609 | A1 | 7/2020 | van der Laan et al. |
| 2020/0206613 | A1 | 7/2020 | Perlman et al. |
| 2020/0206619 | A1 | 7/2020 | van der Laan et al. |
| 2020/0289937 | A1 | 9/2020 | Osman |
| 2020/0396501 | A1 | 12/2020 | Lapicque et al. |
| 2021/0129012 | A1 | 5/2021 | Perry |
| 2021/0166348 | A1 | 6/2021 | Na et al. |
| 2021/0178271 | A1 | 6/2021 | Qiu et al. |
| 2021/0252394 | A1 | 8/2021 | Hwang et al. |
| 2021/0329340 | A1 | 10/2021 | Jeon et al. |
| 2022/0141502 | A1* | 5/2022 | Kosseifi ........... H04N 21/23418 725/139 |
| 2023/0089232 | A1 | 3/2023 | Kopietz |

FOREIGN PATENT DOCUMENTS

| | | |
|---|---|---|
| KR | 10-2016-0143778 A | 12/2016 |
| KR | 10-2017-0022333 A | 3/2017 |
| KR | 10-1954298 B1 | 3/2019 |
| KR | 10-2019-0121407 A | 10/2019 |
| KR | 10-2020-0019855 A | 2/2020 |
| KR | 10-2074513 B1 | 2/2020 |
| KR | 10-2021-0067783 A | 6/2021 |
| KR | 10-2021-0128091 A | 10/2021 |
| WO | 2017/030380 A1 | 2/2017 |
| WO | 2020/194958 A1 | 10/2020 |

OTHER PUBLICATIONS

Isha Salian et al., "What Is AI Upscaling?," Feb. 3, 2020, Total 5 pages.
NVIDIA, "The Next Generation in Cloud Gaming," Website <https://www.nvidia.com/geforce-now>, Total 1 page, retrieved Dec. 5, 2022.
PlayStation Now, "Introducing the All-New Playstation Plus," Web site <https://www.playstation.com/en-us/ps-now/>, 1 page, retrieved Dec. 5, 2022.
Stadia, Web site <https://stadia.google.com/>, 1 page, retrieved Dec. 5, 2022.
Taylor Gadsden, "Have a good internet speed for gaming? What you need to win your online battles," Nov. 12, 2019, Total 12 pages.
Sanam Malhotra, "Upscaling Images With Machine Learning for Optimum Resolution," May 21, 2020, Total 5 pages.
Christopher Thomas, "Deep learning based super resolution, without using a GAN," Feb. 24, 2019, Total 47 pages.
Kevin Murnane, "Google Avoided a Critical Detail About Streaming During It's Stadia Livestream," Jun. 7, 2019, Total 5 pages.
Yi Xiao et al., "Object Detection Based on Faster R-CNN Algorithm with Skip Pooling and Fusion of Contextual Information," Sensors 2020, vol. 20, No. 5490, 2020, Total 20 pages.
Derrick Mwiti, "Image Segmentation with Mask R-CNN," Jun. 1, 2020, Total 6 pages.
Wikipedia, "Generative adversarial network," Last edited on Nov. 7, 2022, Total 33 pages.
JC Torres, "NVIDIA GauGAN neural network makes masterpieces out of doodles," Mar. 19, 2019, Total 5 pages.
Synced, "DeepMind DVD-GAN: Impressive Step Toward Realistic Video Synthesis," Jul. 16, 2019, Total 6 pages.
"Video Generation," Papers With Code, retrieved on May 30, 2021 from https://paperswithcode.com/task/video-generation/latest, Total 6 pages.
Sergey Tulyakov et al., "MoCoGAN: Decomposing Motion and Content for Video Generation," Computer Vision Foundation, pp. 1526-1535, Jun. 18-23, 2018.
Leonardo Galteri et al., "Towards Real-Time Image Enhancement GANs," Sep. 3, 2019, Total 12 pages.
Hristina Uzunova et al., "Memory-efficient GAN-based Domain Translation of High Resolution 3D Medical Images," arXiv:2010.03396v1 [eess.IV], Oct. 6, 2020, Total 27 pages.
WelcomeAIOverlords, "Understanding the Math and Theory of GANs in ~ 10 minutes," Jul. 8, 2019, YouTube <https://www.youtube.com/watch?v=ICR9sT9mbis>, 1 page.
NVIDIA, "Research at NVIDIA: The First Interactive AI Rendered Virtual World," Dec. 3, 2018, YouTube <https://www.youtube.com/watch?v=ayPqjPekn7g>, 1 page.
Arun Mallya et al., "World-Consistent Video-to-Video Synthesis," arXiv:2007.08509v1 [cs.CV], Jul. 16, 2020, Total 25 pages.
Ting-Chun Wang et al., "Video-to-Video Synthesis," arXiv:1808.06601v2 [cs.CV], Dec. 3, 2018, Total 14 pages.

* cited by examiner

METHOD OF STREAMING IMAGE CONTENT BETWEEN SERVER AND ELECTRONIC DEVICE, SERVER FOR STREAMING IMAGE CONTENT, AND ELECTRONIC DEVICE FOR STREAMING IMAGE CONTENT

CROSS-REFERENCE TO RELATED APPLICATIONS

This application is a continuation application of International Application No. PCT/KR2022/018762, filed on Nov. 24, 2022, which is based on and claims priority to Korean Patent Application No. 10-2021-0169438, filed on Nov. 30, 2021, in the Korean Intellectual Property Office, the disclosures of which are incorporated by reference herein in their entireties.

BACKGROUND

1. Field

The disclosure relates to a method of streaming image content between a server and an electronic device, a server for streaming image content and transmitting streaming data, and an electronic device for receiving streaming data, and more particularly, to an image content streaming method, server, and electronic device for obtaining a plurality of frames based on a current state of image content, generating a plurality of prediction frames based on the plurality of frames and a plurality of possible user inputs, obtaining metadata from the plurality of frames and the plurality of prediction frames, and generating streaming data of the image content based on at least one of the plurality of prediction frames or the metadata and transmitting the streaming data.

2. Description of Related Art

In the related art, games with client-side rendering have been available over the web, but as image content services such as online game streaming have become possible due to low network latency and high data center performance, now users who have registered on game streaming platforms (for example, registered users on Nvidia GeForce Now, PlayStation Now, and Google Stadia) are able to control their characters in highly dynamic scenes in games that require specialized hardware. For example, a user may register with a game streaming service, and a service provider may generate a game stream, which may be similar to a video stream. The user may control the game by transmitting an input to a server of the service provider by using a touch screen or a mouse, etc. In game streaming as above, technologies such as image upscaling technology for reducing a bandwidth and improving quality, and technologies for improving the resolution and picture quality of earlier games designed with low resolution, for example resolutions associated with a Video Graphics Array (VGA) format and a Super VGA (SVGA) format, may be used.

As the reality of a game cannot be properly reflected due to the high latency in game streaming services, game streaming service providers may lower a latency (a ping of 20 ms to 10 ms is suitable for most games) in order to satisfy the users. In addition, both a client and a server which use a game may desire to have a bandwidth of at least 1 Mbps for a low-resolution game to 30 Mbps for uploading or downloading of games having resolutions such as a 4K resolution, and when the bandwidth is lowered, game streaming users may experience intermittent resolution drops. All communications to game streaming service users may be directly connected to a data center or server of the service provider, and the data center may generate individual video streams again and transmit the same to every single user.

With recent progress in streaming-related technology and artificial intelligence-related technology, and the development and dissemination of hardware that allows reproduction and storage of high-resolution/high-quality images, in streaming of image content, there is an increasing need for an image streaming method, performed by an electronic device, of reproducing an image transmitted from a server by immediately responding to a user input without a delay (e.g., lag), for a server for streaming image content, and for the electronic device.

SUMMARY

According to an embodiment of the disclosure, a method, performed by a server, of streaming image content, including obtaining one or more frames of the image content which is currently being executed by an electronic device, identifying a plurality of user inputs inputtable by a user, corresponding to the one or more frames, generating a plurality of prediction frame sets respectively corresponding to the plurality of user inputs, wherein each prediction frame set of the plurality of prediction frame sets includes a plurality of prediction frames to be displayed after the one or more frames, obtaining metadata from the one or more frames and the plurality of prediction frame sets, generating streaming data of the image content to be provided to the electronic device, based on at least one of the plurality of prediction frame sets or the metadata, and transmitting the generated streaming data to the electronic device.

According to an embodiment of the disclosure, a method, performed by an electronic device, of streaming image content, including receiving streaming data of the image content from a server, displaying, from the received streaming data, one or more frames of the image content currently being executed by the electronic device, identifying a delay time of a current network between the server and the electronic device, based on the delay time and a current user input, determining, from the received streaming data, whether to display a plurality of prediction frames included in a prediction frame set corresponding to the current user input among a plurality of prediction frame sets respectively corresponding to a plurality of possible user inputs, displaying the plurality of prediction frames, based on determining to display the plurality of prediction frames, and waiting for reception of second streaming data corresponding to the current user input based on determining not to display the plurality of prediction frames.

According to an embodiment of the disclosure, a server may be include a communication interface configured to transmit streaming data of image content to an electronic device, and at least one processor. The at least one processor may obtain one or more frames of the image content which is currently being executed by the electronic device. The at least one processor may identify a plurality of user inputs inputtable by a user, corresponding to the one or more frames. The at least one processor may generate a plurality of prediction frame sets respectively corresponding to the plurality of user inputs, wherein each prediction frame set of the plurality of prediction frame sets includes a plurality of prediction frames to be displayed after the one or more frames. The at least one processor may obtain metadata from the one or more frames and the plurality of prediction frame sets. The at least one processor may generate streaming data of the image content to be provided to the electronic device, based on at least one of the plurality of prediction frame sets or the metadata. The at least one processor may transmit the generated streaming data to the electronic device.

According to an embodiment of the disclosure, an electronic device may be include a communication interface configured to receive streaming data of image content from a server, a display; and at least one processor. The at least one processor may receive streaming data of the image content from a server. The at least one processor may restore, from the received streaming data, one or more frames of the image content currently being executed by the electronic device, and display the one or more frames. The at least one processor may identify a delay time of a current network between the server and the electronic device, based on the delay time and a current user input. The at least one processor may determine, from the received streaming data, whether to display a plurality of prediction frames included in a prediction frame set corresponding to the current user input among a plurality of prediction frame sets respectively corresponding to a plurality of possible user inputs. The at least one processor may based on determining to display the plurality of prediction frames, restore the plurality of prediction frames and display the plurality of prediction frames on the display. The at least one processor may based on determining not to display the plurality of prediction frames, wait for reception of second streaming data corresponding to the current user input.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
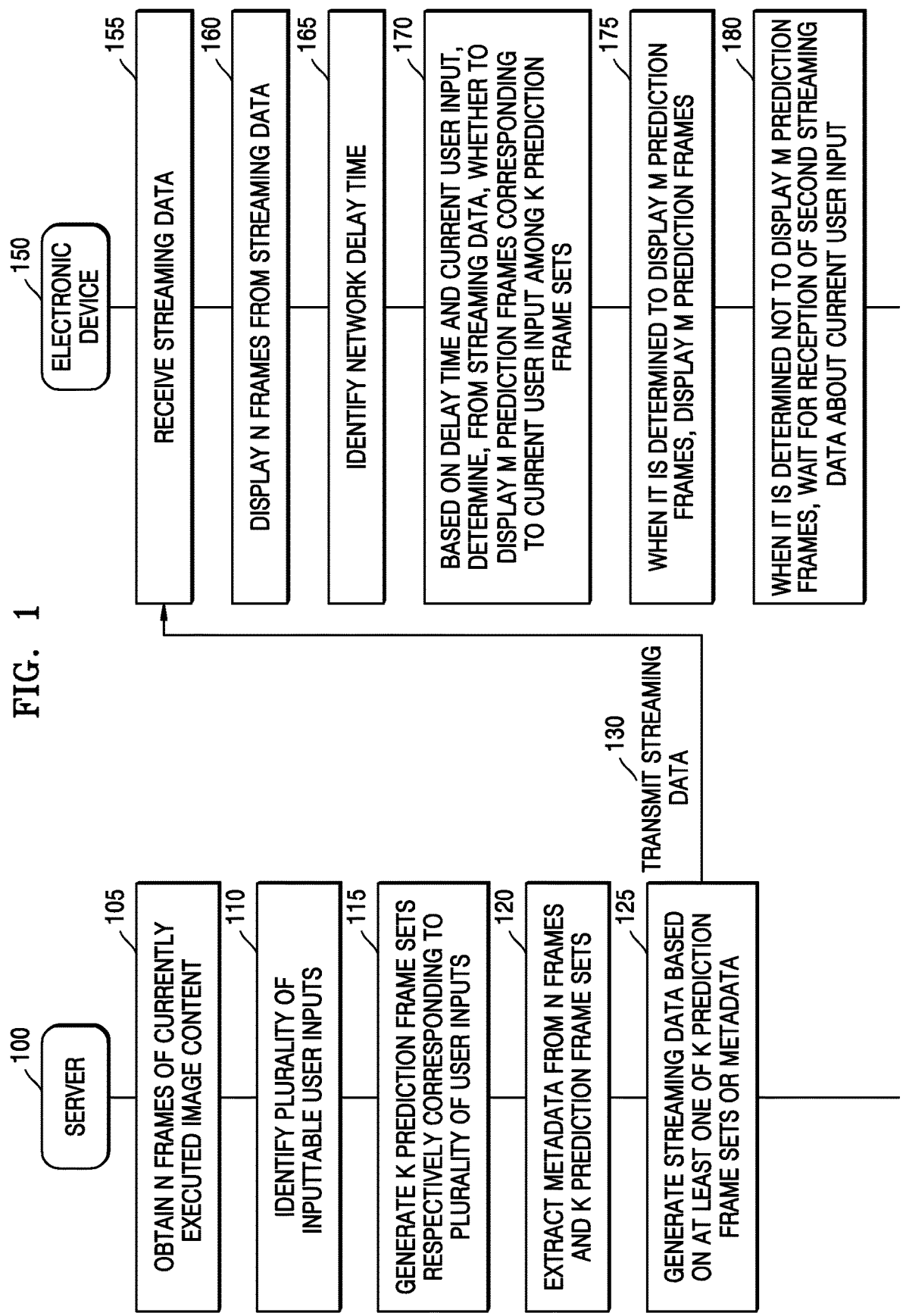
FIG. 1 is a diagram illustrating a process of streaming image content between a server and an electronic device, according to an embodiment of the disclosure.

Throughout the disclosure, the expression "at least one of a, b or c" indicates only a, only b, only c, both a and b, both a and c, both b and c, or all of a, b, and c, or variations thereof.

As the disclosure allows for various changes and many different forms, particular embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure.

In the description of an embodiment of the disclosure, certain detailed explanations of related art are omitted when it is deemed that they may unnecessarily obscure the essence of the disclosure. Numbers used in the description of the specification (for example, "first,", "second," etc.) are merely symbols used to distinguish one element from another.

Throughout the specification, it will also be understood that when an element is referred to as being "connected to" or "coupled to" another element, it can be directly connected or directly coupled to the other element, or unless there is a particular description contrary thereto, it can be connected or coupled to the other element and intervening elements may be present.

In addition, in the present specification, elements expressed as ' . . . part (unit)', 'module', etc. may be two or more elements combined into one element, or one element that is divided into two or more according to subdivided functions. In addition, each of elements to be described below may additionally perform some or all of the functions of other elements in addition to the main functions which each element is in charge of, and also, some of the main functions of each of the elements may be assigned to another element and performed exclusively by the element.

Also, in the present specification, an 'image' or 'picture' may indicate a still image, a moving picture composed of a plurality of consecutive still images (or frames), or a video.

In the present specification, "image content" refers to game image content, virtual reality (VR) game image content, augmented reality (AR) game image content, image content, VR image content, AR image content, and the like.

In the disclosure, 'augmented reality (AR)' refers to showing a virtual image together in a physical environment space of the real world or showing a real object and a virtual image together.

In the disclosure, 'virtual reality (VR)' refers to making people feel through their sense organs that they are actually interacting in an environment or situation created with computer graphics having an environment similar to reality. A user may interact with VR in real time through manipulation of an electronic device, and may have a sensory experience similar to the real one.

Also, in the present specification, a 'deep neural network (DNN)' is a representative example of an artificial neural network model simulating brain nerves, and is not limited to an artificial neural network model using a specific algorithm.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. In embodiments, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

FIG. 1 is a diagram illustrating a process of streaming image content between a server and an electronic device, according to an embodiment of the disclosure.

As illustrated in FIG. 1, according to an embodiment of the disclosure, first, a server 100 obtains N frames of image content that is currently being executed by an electronic device 150 at operation 105. In an embodiment, N may be an integer greater than 0. The N frames correspond to a current image of the image content being displayed on a screen of the electronic device 150. In preparation for a long delay time of a network between the server 100 and the electronic device 150, for example in a situation in which lag occurs, the server 100 identifies a plurality of user inputs that may be input by a user at operation 105, in regard to the N frames, and generates K prediction frame sets respectively corresponding to the plurality of user inputs at operation 115. In an embodiment, K may be an integer greater than 0. Each of the prediction frame sets includes M prediction frames that may be displayed after the N frames. In an embodiment, M may be an integer greater than 0. The server 100 generates prediction frames respectively corresponding to possible user inputs based on the N frames. The server 100 extracts metadata from the N frames and K prediction frame sets at operation 120, generates streaming data based on at least one of the K prediction frame sets or the metadata at operation 125, and transmits the streaming data to the electronic device 150 at operation 130.

An "inputtable user input" refers to a user input that is allowed in the currently executed image content. In an embodiment, an inputtable user input may be referred to as a possible user input. For example, when image content is image content of a car racing game, a user input may include an input for up, down, left, and right directions, an input for increasing the speed, and an input for reducing the speed. Also, a case in which nothing is input may be included as a user input. Also, for a multi-player game, an inputtable user input may be an action performed by another player.

A prediction frame included in a prediction frame set is a frame predicted to be displayed after the N frames according to a user input related to the N frames. In addition, the prediction frame may be generated using an artificial intelligence model trained to generate a prediction frame after frames, for example a DNN, according to types of the frames and user inputs. For example, the server 100 may provide training data of an artificial intelligence model necessary for generating a prediction frame, to the electronic device 150, and the electronic device 150 may effectively restore prediction frames generated by the server 100, based on the training data.

In training an artificial intelligence model that is used to predict possible states and user actions in a game, it is important to be clear about what possible user inputs are. For example, a user input may be to continuously press and hold a key, or to continuously press a key and then release the key. Also, in case a user is not likely to press two keys together, as a prediction for the user input, a prediction for pressing key_up, a prediction for pressing key_down, and a prediction for pressing nothing may be prepared.

As described above, by making clear information about possible user inputs, better frame prediction may be conducted using an artificial intelligence model trained based on the above information, and an amount of data delivered to a user may be limited.

A number M of prediction frames in a prediction frame set may be determined according to a delay time of a current network between the server 100 and the electronic device 150. For example, when the delay time is greater than or equal to a certain period of time, such as when the lag is severe (for example, when a ping is equal to or greater than a certain size), a large number of prediction frames are required. However, when the delay time is less than a certain period of time, such as when the lag is not severe (for example, when the ping is less than a certain size), additional streaming data for a current input may be quickly received, and thus, only a small number of prediction frames are required.

Also, the number M of prediction frames may be defined by being limited by a service provider that provides image content. In this way, complexity and power consumption may be reduced when preparing prediction data. This method is important because, when a user input is input through a touch screen (e.g., 1920*1080), a number of predictable cases may become extremely large. In this case, by predicting a user input for a predefined area (e.g., a user interface area on a screen) or a low-scale grid area (e.g., a grid area of 10*10, 19*10), a number of prediction cases may be reduced.

Metadata may include information about at least one of an object, a shape, or an attribute in a frame. For example, the metadata may be areas such as faces, a human body, walls, trees, cars, the sky, or another typical type of predictable objects in image content. These areas are described by shapes and attributes. The areas may be an area on the screen, for example the shape of a human head, and the attribute may be a style of an object, for example, color information, pattern information, or the like, according to a numeric value displayed in a graphic format. In addition, the attribute may indicate how the shape from a first frame 1 to a last frame N+M changes, and may indicate how the style from the first frame 1 to the last frame N+M changes, and how the areas change according to each possible user input.

The metadata may include information about a prediction of each area and information about how image content is displayed according to each prediction scenario. Accordingly, the metadata may be applied to one or more prediction scenarios. For example, according to a user input for up, down, left, and right through a controller, four frame predictions for four different user actions may be performed.

A method of generating (streaming data based on at least one of the K prediction frame sets or the metadata at operation 125 may include generating streaming data by converting image content in a following manner.

First, a prediction frame may be downscaled, and streaming data may be generated using the downscaled prediction frame. Here, information about a downscaling ratio and a downscaling method may be added to the metadata. In addition, in regard to an object of downscaling, the entire prediction frame or only a partial area of a frame may be downscaled. In addition, downscaling may be performed using an artificial intelligence model trained to effectively downscale input frames.

By reducing a size of an image or video by using downscaling, a bandwidth capacity from a server to a user of image content may be reduced, network latency may be lowered, and a delay of the image content may be eliminated.

Second, streaming data may be generated by marking object information corresponding to objects in a prediction frame. For example, even when a sky area is not included in the streaming data, when object information indicating that the corresponding area is the sky is marked and transmitted according to preset rules, the electronic device 150 may be aware that the corresponding area is the sky area according to the object information, and the area may be restored to a sky. This method may be performed through a trained Generative Adversarial Network (GAN). For example, a certain area may be restored using object information marked using the GAN.

Third, streaming data may be generated using some of the prediction frames. For example, a first frame, an intermediate frame, a last frame, and metadata are transmitted through the trained GAN. Thereafter, the electronic device 150 may restore the remaining frames through the GAN by using the first frame, the intermediate frame, the last frame, and the metadata.

Fourth, only metadata about areas may be provided without a video frame. The electronic device 150 may restore frames by using metadata about the areas. This method may also be performed through a trained artificial intelligence model. For example, in a game image content streaming service, a game engine running in the cloud maintains the world in a game, and changes positions of players and objects, their attributes, etc. in response to actions of the players, and a server transmits metadata used to generate 2D graphics displayed on a screen in an electronic device, without rendering an image, and the electronic device completely renders an image displayed on a screen of a player in the electronic device by using the metadata. By transmitting only metadata instead of an image, as above, bandwidth usage in a game streaming service may be reduced. In addition, when the role of rendering an image is transferred from the server to the electronic device, the server running the game engine may use relatively little computing power, thereby optimizing the usage of cloud hardware. For multiplayer games, one instance of a game streaming server may process a game and transmit the same metadata to all players.

In addition, the above methods may be mixed or combined in any manner, and may be applied according to a service provider strategy such as bandwidth optimization, resolution optimization, frame rate optimization, and latency optimization.

According to an embodiment of the disclosure, the electronic device 150 receives streaming data from the server 100 at operation 155. The electronic device 150 may restore frames for image content based on at least one of frames or metadata included in the streaming data received from the server 100. The electronic device 150 first displays N frames of the image content currently being executed by the electronic device 150, from the received streaming data, at operation 160. The N frames may be a result of a response of the server 100 to a user input previously input to the electronic device 150. The electronic device 150 identifies a delay time of a current network between the server 100 and the electronic device 150 at operation 165. Based on the delay time and a current user input, the electronic device 150 determines, from the received streaming data, whether to display M prediction frames included in a prediction frame set corresponding to the current user input among the K prediction frame sets corresponding to a plurality of possible user inputs at operation 170. The current user input may be a click on a screen, an input of a keyboard, an input of a mouse, an input of a controller, an input of a steering wheel, and the like. When it is determined to display the M prediction frames, the electronic device 150 displays the M prediction frames at operation 175. The prediction frames may be generated by inputting, by the electronic device 150, streaming data transmitted from the server 100, to an artificial intelligence model trained to generate prediction frames. When the electronic device 150 determines not to display the M prediction frames, the electronic device 150 waits for reception of second streaming data about the current user input at operation 180.

In addition, when the second streaming data about the current user input is received while the M prediction frames are being displayed, the electronic device 150 may stop displaying the M prediction frames and display the frames of the received second streaming data. For example, when the second streaming data is received while an intermediate frame of a prediction frame N+1 to a prediction frame N+M is being displayed, the electronic device 150 may stop displaying the prediction frames, and replace the prediction frames with N frames corresponding to the current user input and display the N frames.

Also, when the received second streaming data has a relatively low resolution, the electronic device 150 may restore an image to a high resolution based on the second streaming data and the streaming data. Also, even when the second streaming data is received, when a delay time is greater than or equal to a certain period of time, the electronic device 150 may display frames predicted based on already received second streaming data and the streaming data. For example, the electronic device 150 may generate and display new prediction frames based on frames of the second streaming data associated with the current user input and the prediction frames based on the streaming data received before the second streaming data.

Also, when a delay such as frame omission is detected, the electronic device 150 may display image content based on previous frames and prediction frames based on the current user input. For example, when an area in a previous frame is rotated according to a rotation input of a steering wheel from a viewpoint of a user, the electronic device 150 may display prediction frames with respect to the rotation input.

To optimize at least one of performance, bandwidth, delay removal, or image quality of the server 100 and the electronic device 150, the electronic device 150 may transmit, to the server 100 of the service provider which adjusts prediction and data to be transmitted to the electronic device 150 of the user, information about a graphics processing unit (GPU), a neural processing unit (NPU) of the electronic device 150 and information about a library and models supported by the electronic device 150. Each of the GPU and NPU may be utilized in a most efficient manner. For example, when one of the GPU and NPU is designed to upscale an image, it may be utilized when upscaling, and the other one of the GPU and NPU may also be utilized according to their role, or as a general-purpose computing on graphics processing units (GPGPU) which is a general-purpose processing unit. High-resolution deep learning methods are not universally applied to all types of images, and as each method has its pros and cons, they may be utilized according to the role appropriate for each design.

When two or more prediction strategies among prediction strategies predicted by the server 100 are appropriate for a current situation (for example a current user input), the electronic device 150 may implement one of the two or more prediction strategies, or may mix or combine some or all of two or more prediction strategies according to defined methods or formulas and implement the same. In this case, the electronic device 150 may minimize an error rate between an actual result and a predicted result.

When the electronic device 150 is not able to use a prediction made by the server 100, the electronic device 150 may display a last frame, or may select one of a most probable prediction scenario or a most preferred prediction scenario and generate a new frame. Even when a current error rate is less than a threshold value of an error rate allowable by the electronic device 150, the electronic device 150 may display a last frame, or may select one of a most probable prediction scenario or a most preferred prediction scenario and generate a new frame.

Restoration of streaming data received by the electronic device 150 may be performed according to a method of generating streaming data in the server 100.

First, when streaming data is downscaled and transmitted, through information about a downscaling ratio and a downscaling method included in the streaming data, an image may be upscaled in a manner corresponding to the downscaling ratio and the downscaling method. Also, when only a partial area of the image is downscaled, only a partial area of the image may be upscaled. In addition, upscaling may be performed using an artificial intelligence model trained to effectively upscale frames, based on downscaling-related information transmitted from the server 100.

Second, when streaming data is generated and transmitted by marking object information corresponding to objects in a prediction frame, the electronic device 150 may restore a corresponding area through a trained GAN according to the object information included in the streaming data. For example, when object information is marked such that a partial area of an image is the sea, the corresponding area may be restored to the sea through a trained GAN.

Third, some of prediction frames and metadata may be included in the streaming data and transmitted. In detail, when a first frame, an intermediate frame, a last frame, and metadata are transmitted, the electronic device 150 may restore the remaining frames through the GAN by using the first frame, the intermediate frame, the last frame, and the metadata.

Fourth, only metadata for areas may be included in streaming data without a video frame and be transmitted. The electronic device 150 may restore frames by using metadata about each of the areas of the frames, without frames. This method may be performed through a trained artificial intelligence model.

Also, when streaming data is transmitted by mixing or combining some or all the above methods, an image may be restored according to each method.

Through the above, when a delay time of a network between the server 100 for streaming image content and the electronic device 150 is greater than or equal to a certain period of time, a prediction frame set corresponding to a current user input that is input to the electronic device 150 among prediction frame sets prepared by the server 100 is displayed, thereby improving user experience for image content of a user by preventing the user from feeling lag, and seamlessly displaying the image. For example, because there is no long response time between a user input and a result on a screen, in dynamic game streaming (e.g. racing games), spoiling user experience due to collisions caused by long latencies or incorrect travel paths may be prevented. In addition, image content may be efficiently streamed from an electronic device such as a smart TV that may utilize a trained artificial intelligence model to stream the image content. In addition, by restoring the image content in an electronic device by using an artificial intelligence model, the burden on a streaming server side may be reduced, thereby reducing bandwidth at the time of image streaming.

Figure 2:
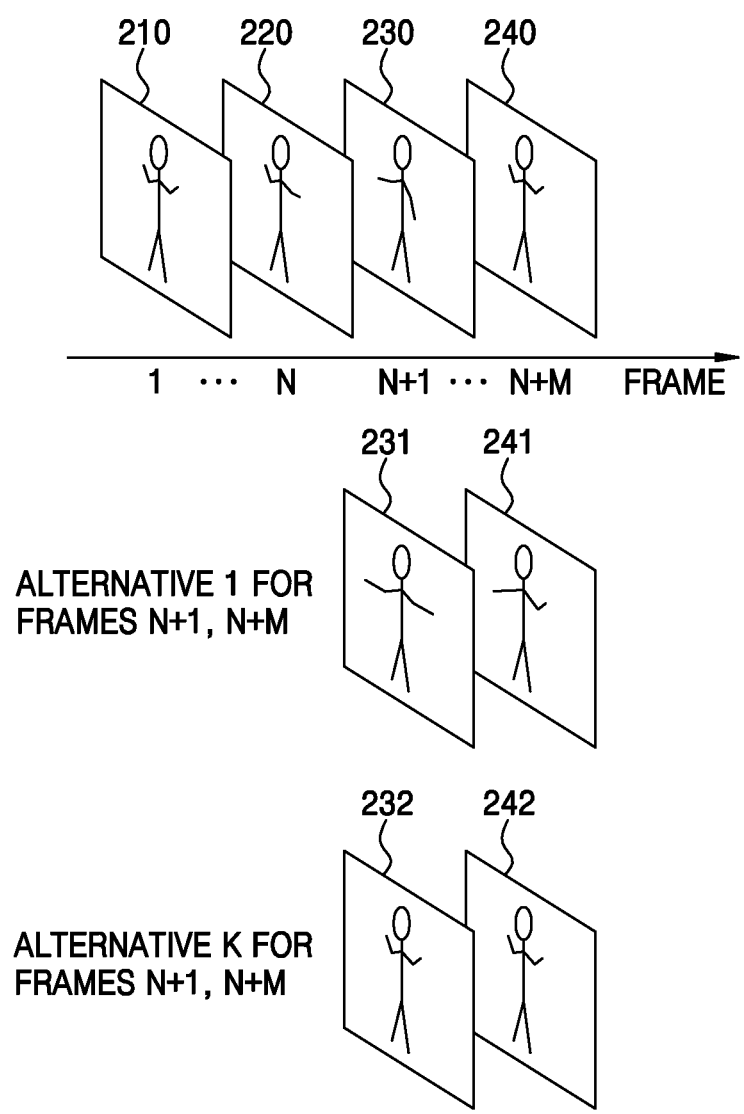
FIG. 2 is a diagram illustrating an example of generating a prediction frame by a server according to an embodiment of the disclosure.

FIG. 2 is a diagram illustrating an example of generating a prediction frame by a server according to an embodiment of the disclosure.

Referring to FIG. 2, N frames of image content currently being executed by the electronic device 150, for example frame 1 210 to frame N 220 are displayed, and when a delay time of a network between the server 100 and the electronic device 150 is shorter than a certain period of time and thus the server 100 is able to immediately respond to a current user input from the electronic device 150, M frames corresponding to a response to the current user input, for example frame N+1 230 through frame N+M 240 are displayed.

However, when the delay time between the server 100 and the electronic device 150 is greater than or equal to a certain period of time, and so the server 100 is not able to immediately respond to the current user input in the electronic device 150, the server 100 may generate, based on the N frames, M prediction frames respectively corresponding to a plurality of possible user inputs in the electronic device 150, that is, prediction frame N+1 231 to prediction frame N+M 241 corresponding to a first user input among a plurality of user inputs, a prediction frame N+1 232 to a prediction frame N+M 242 corresponding to a Kth user input among the plurality of user inputs. The server 100 may extract metadata from the N frames and K prediction frame sets, and generate streaming data based on at least one of the K prediction frame sets or the metadata, and transmit the streaming data to the electronic device 150. Accordingly, when the delay time is greater than or equal to a certain period of time, the electronic device 150 generates prediction frames corresponding to the current user input based on at least one of the prediction frame set or the metadata, and replaces the frame N+1 (230) to the frame N+M 240 with the generated prediction frames.

Figure 3:
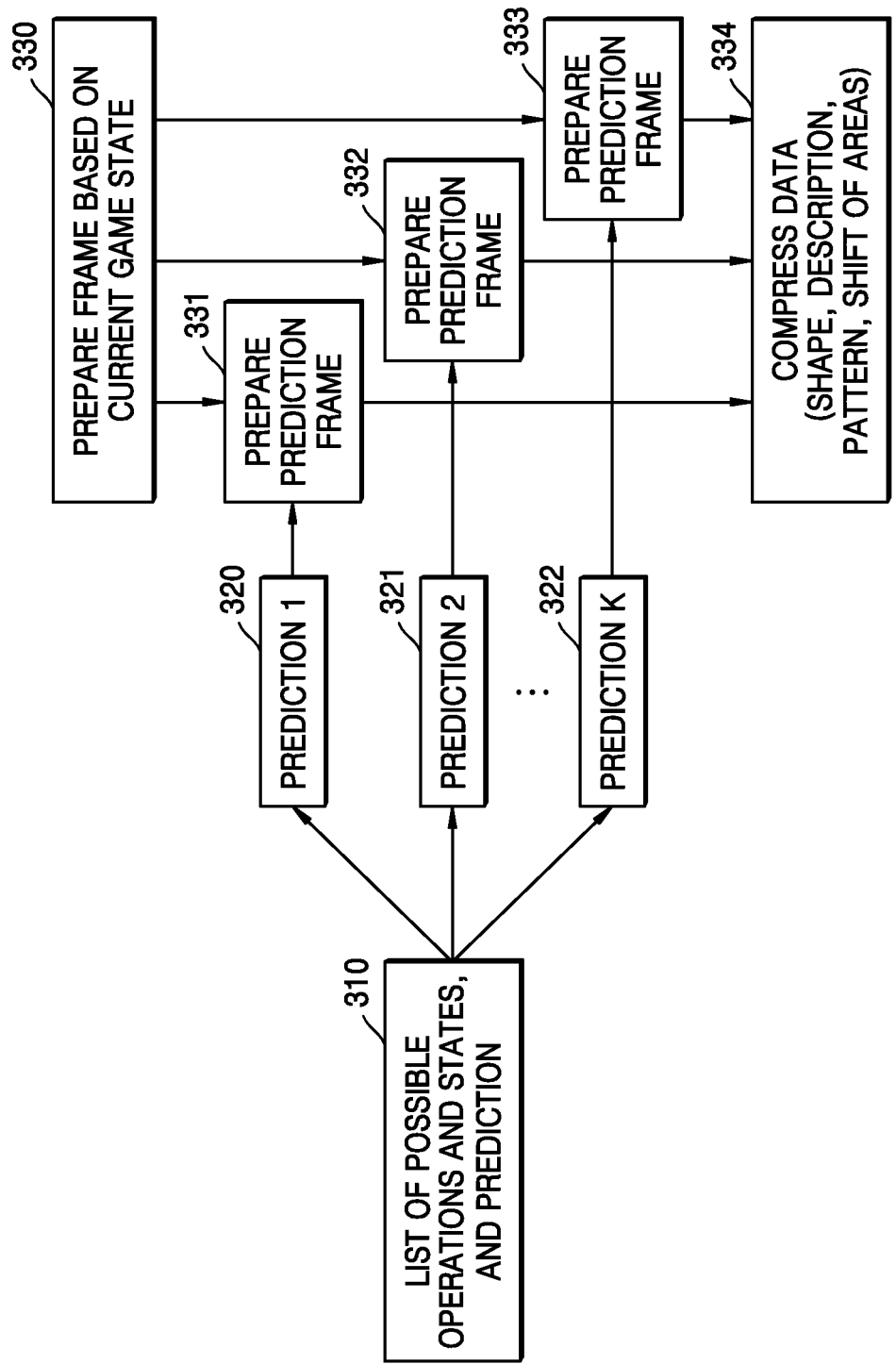
FIG. 3 is a diagram illustrating an example of preparing, by a server, frames and prediction frames, according to an embodiment of the disclosure.

FIG. 3 is a diagram illustrating an example of preparing, by a server according to an embodiment of the disclosure, frames and prediction frames.

Referring to FIG. 3, the server 100 prepares frames based on a current state of image content (for example, a game) at operation 330. Next, the server 100 predicts next frames according to a list of currently possible content operations and states at operation 310. According to the possible content operations, prediction frames are prepared at operations 331, 332, and 333, according to prediction 1 320, prediction 2 321, . . . , prediction K 322. The server 100 may extract metadata about a shape, description, pattern, shift of areas of a frame based on the prepared prediction frames.

The server 100 compresses data based on at least one of the prepared frames, the prepared prediction frames, or the metadata at operation 334.

Figure 4:
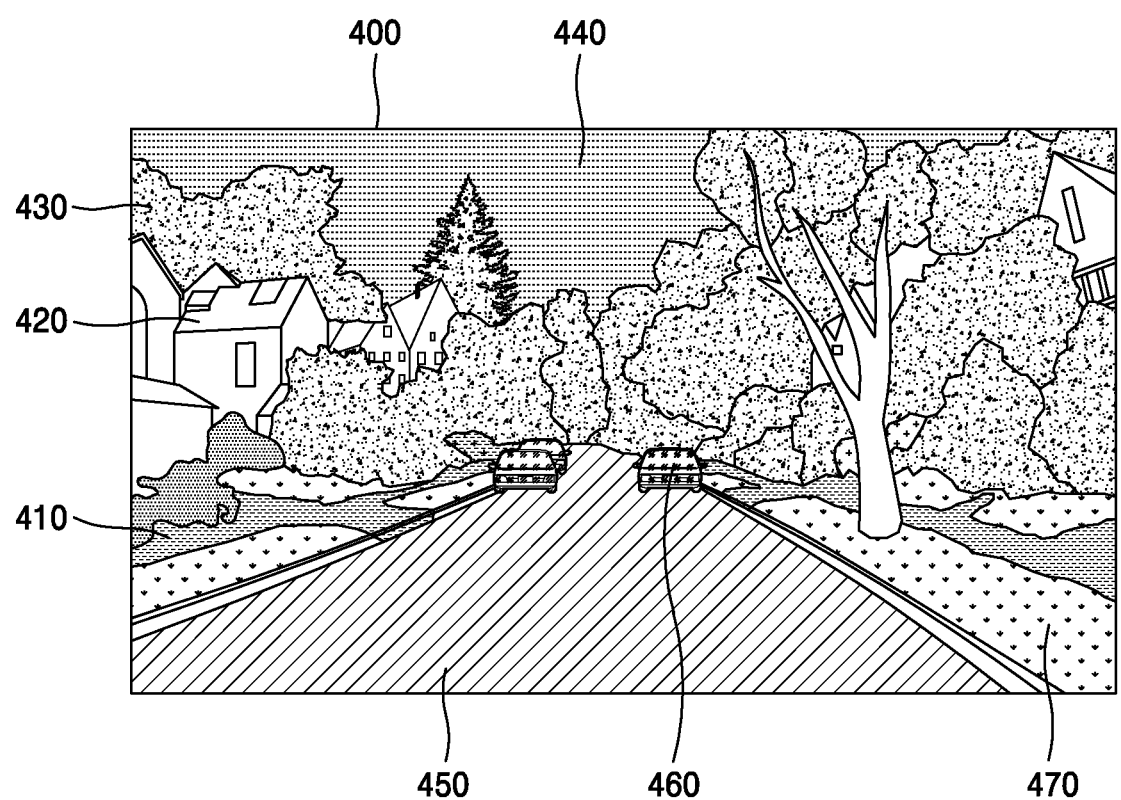
FIG. 4 is a diagram for describing examples of generating, by a server, streaming data based on at least one of prediction frame sets or metadata, according to an embodiment of the disclosure.

FIG. 4 is a diagram for describing examples of generating, by a server according to an embodiment of the disclosure, streaming data based on at least one of prediction frame sets or metadata.

Referring to FIG. 4, in a racing game, image content 400 includes a sky area 440, a tree area 430, a house area 420, a sidewalk area 410 where people pass, and a road area 450 where cars drive, a car area 460, a grass area 470, and the like.

Attributes such as colors, patterns, and transformation (transfer, extension, etc.) between frames of the image content 400 may be added to areas within the image content 400. The information as above is used to eliminate screen freezes when data latency increases. An electronic device generates additional prediction frames (for example prediction frame N+1 to prediction frame N+M) based on previous frames (for example frame 1 to frame N) and metadata and prediction data for each area. This prevents screen freezes caused by long network delays in dynamic game streaming, which may result in a frustrating experience for the user and deteriorate the user experience, and instead allows the user to expect a seamless, lag-free game.

As one method of generating streaming data of image content by a server, the entire image content 400 may be down-scaled based on an artificial intelligence model to generate streaming data, and information about a downscaling ratio may be included in metadata. In addition, only some of the areas included in the image content 400, for example, the sky area 440, the road area 450, and the grass area 470, may be downscaled based on the artificial intelligence model to generate streaming data, and information about some areas and downscale ratios of the some areas may be included in metadata. By using downscaling, a bandwidth from the server 100 to the electronic device 150 may be improved, and lag of the image content may be eliminated by reducing latency.

As another method of generating streaming data, object information corresponding to each object of the image content 400 may be marked. For example, by marking objects in the image content 400, the marked information may be transmitted as metadata. For example, with respect to the sky area 440 in the image content 400, even when data about the sky is not included in the streaming data, a certain numerical value may be used to indicate that the sky area 440 is the sky (e.g., "0" is the sky), marked as object information, and included in metadata and transmitted. Accordingly, the electronic device 150 may generate the corresponding area as the sky area by using an artificial intelligence model according to preset rules.

As another method of generating streaming data, streaming data may be generated using some of frames of image content and metadata. For example, a first frame, an intermediate frame, and a last frame among frames and metadata for each area of the image content may be transmitted as streaming data.

As another method of generating streaming data, streaming data may be generated such that the streaming data includes only metadata about image content.

Also, streaming data may be generated by mixing or combining some or all of the methods described above.

Figure 5:
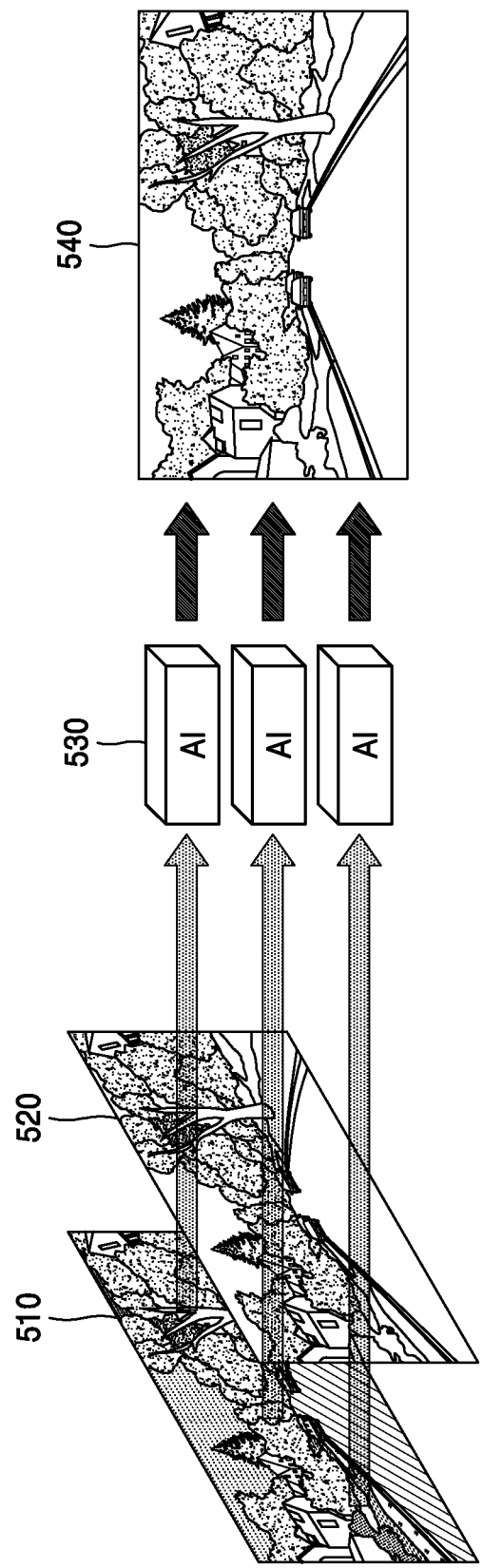
FIG. 5 is a diagram for describing examples of restoring, by an electronic device according to an embodiment, streaming data based on at least one of prediction frame sets or metadata, according to an embodiment of the disclosure.

FIG. 5 is a diagram for describing example of restoring, by an electronic device according to an embodiment of the disclosure, streaming data based on at least one of prediction frame sets or metadata.

Referring to FIG. 5, image content 540 may be restored according to an artificial intelligence model 530 based on at least one of metadata 510 or a frame 520 included in an image.

For example, by using a downscaled frame and metadata including downscaling information, image content may be restored by upscaling the downscaled frame according to an artificial intelligence model. In addition, when only a partial area of the frame is downscaled, the downscaled partial area may be upscaled and image content may be restored according to an artificial intelligence model by using the downscaled partial area, information about the partial area, and information about downscaling.

As another example, image content may be restored according to an artificial intelligence model based on marked object information corresponding to each object of the image content.

As another example, image content may be restored according to an artificial intelligence model by using some of frames of the image content and metadata in the streaming data. For example, the image content may be restored according to the artificial intelligence model by using the first frame, the intermediate frame, and the last frame among the frames, and metadata for each area of the image content.

As another example, image content may be restored according to an artificial intelligence model by using only metadata about the image content included in streaming data.

As another example, when streaming data transmitted from a server is generated by mixing or combining some or all of several methods, streaming data transmitted according to each method may be restored as image content.

Figure 6A:
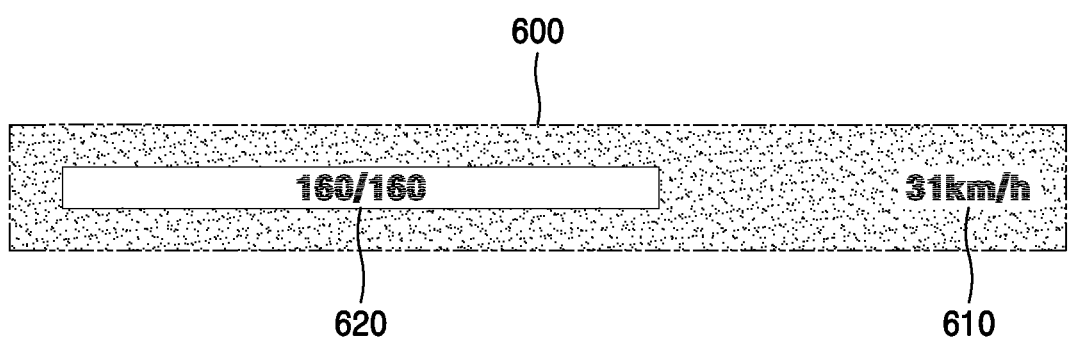
FIG. 6A is a diagram for describing an example of image streaming in poor network conditions.

FIG. 6A is a diagram for explaining an example of image streaming without using an artificial intelligence model, when a streaming state is poor.

Referring to FIG. 6A, when an image resolution drop occurs during image content streaming (e.g., game streaming), quality of texts in image content may deteriorate, making it difficult to read. For example, image quality of a text 620 representing a character's strength gauge bar and a text 610 representing a speed in game image content 600 may be blurred and a user may not be able to read the texts, which causes inconvenience to the user who uses a game streaming service.

Figure 6B:
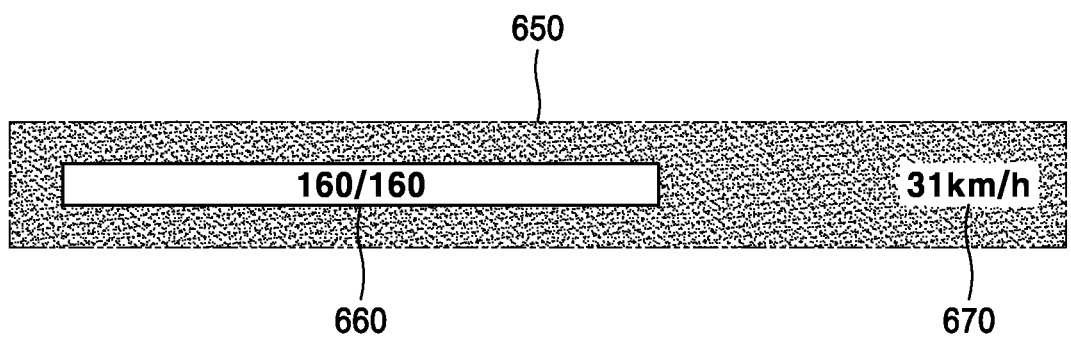
FIG. 6B is a diagram for describing an example of image streaming according to an embodiment of the disclosure.

FIG. 6B is a diagram for describing an example of image streaming according to an embodiment of the disclosure.

Unlike FIG. 6A, referring to FIG. 6B, when an artificial intelligence model is used, even when a resolution drop occurs due to poor network conditions, image content may be restored to high-quality image content showing readable actual numerical values according to an artificial intelligence model (e.g., GAN) based on metadata and prediction frames. For example, even when a resolution drop occurs due to poor network conditions, a text 660 indicating a character's strength gauge bar and a text 670 indicating a speed in game image content 650 may be clearly restored according to an artificial intelligence model. In addition, texts may be rendered with a desired font, format, location, and background defined by a service provider by using a special GAN, for example a GAN that is specifically trained for rendering texts.

Figure 7:
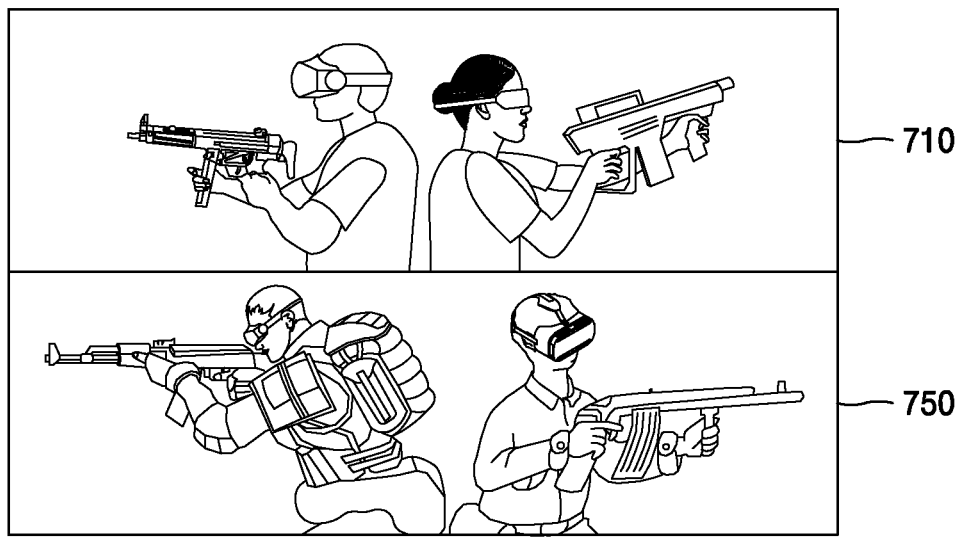
FIG. 7 is a diagram for describing an example of image content.

FIG. 7 is a diagram for describing an example of image content.

Referring to FIG. 7, image content may include VR game image content, AR game image content, VR image content, and AR image content as well as game image content. Streaming AR games or VR games may use significant bandwidths, but reducing the bandwidth and quality of content may be unacceptable when other participants' faces are streamed. Accordingly, a service provider may provide additional data such as prediction frames and metadata to generate content in an electronic device. For example, when two players play a VR game as shown in scenario 710, and when VR game image content 750 is displayed, and users move their head, in order to take an immediate response accordingly, the electronic device may generate new frames based on content that is already received and metadata about areas within the content. For example, in the VR game image content 750, a motion of moving a user's head may be a user input. Next, when newly updated stream data according to the motion of the user is received from a server to the electronic device worn by the user, the generated frames may be replaced with a frame received from the server.

Figure 8:
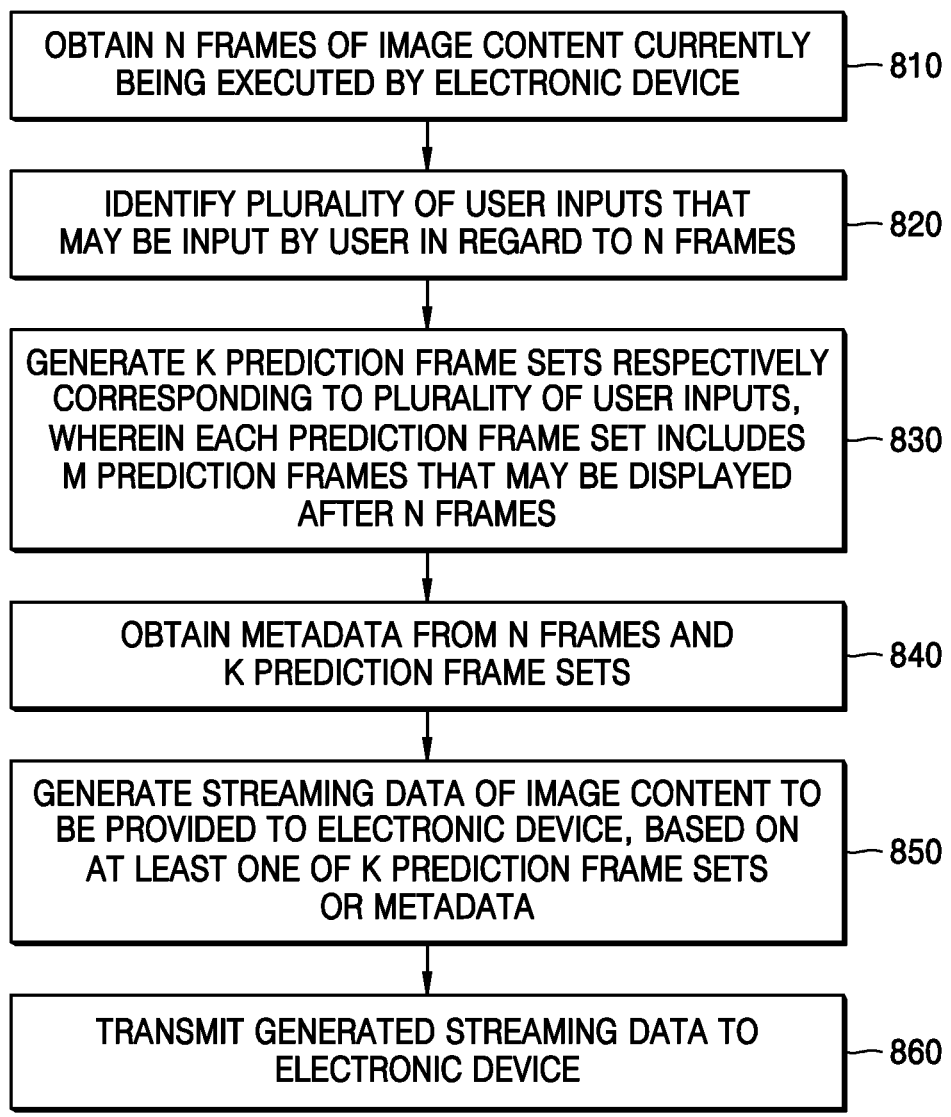
FIG. 8 is a flowchart of a method of transmitting, by a server, streaming data of image content to an electronic device, according to an embodiment of the disclosure.

FIG. 8 is a flowchart of a method of transmitting, by a server according to an embodiment of the disclosure, streaming data of image content to an electronic device.

Referring to FIG. 8, at operation 810, a server 900 obtains N frames of image content currently being executed by an electronic device 1100.

At operation 820, the server 900 identifies a plurality of user inputs that may be input by a user in regard to, or based on, the N frames.

According to an embodiment of the disclosure, the N frames may correspond to a current image of image content being displayed on a screen of the electronic device 1100.

At operation 830, the server 900 generates K prediction frame sets corresponding to a plurality of user inputs. Each of the prediction frame sets includes M prediction frames that may be displayed after the N frames.

According to an embodiment of the disclosure, a prediction frame may be a frame predicted to be displayed after the N frames according to a user input related to the N frames.

In addition, according to an embodiment of the disclosure, the prediction frame may be generated using an artificial intelligence model trained to generate a prediction frame after frames, according to types of the frames and user inputs.

According to an embodiment of the disclosure, a number M of the prediction frames in each prediction frame set may be determined based on a delay time of a current network between the server 900 and the electronic device 1100.

At operation 840, the server 900 obtains metadata from the N frames and K prediction frame sets.

According to an embodiment of the disclosure, metadata may include information about at least one of an object, a shape, or an attribute in a frame.

At operation 850, the server 900 generates streaming data of image content to be provided to the electronic device 1100, based on at least one of the K prediction frame sets or the metadata.

According to an embodiment of the disclosure, streaming data may be generated by downscaling a prediction frame and using the downscaled prediction frame. Also, the entire area of prediction frame may be downscaled or a partial area of the prediction frame may be downscaled. The metadata may include information about a downscaling ratio.

According to an embodiment of the disclosure, streaming data may be generated by marking object information corresponding to objects in a prediction frame.

According to an embodiment of the disclosure, streaming data may be generated using some of the prediction frames.

According to an embodiment of the disclosure, streaming data may be generated using only metadata.

At operation 860, the server 900 transmits the generated streaming data to the electronic device 1100.

Figure 9:
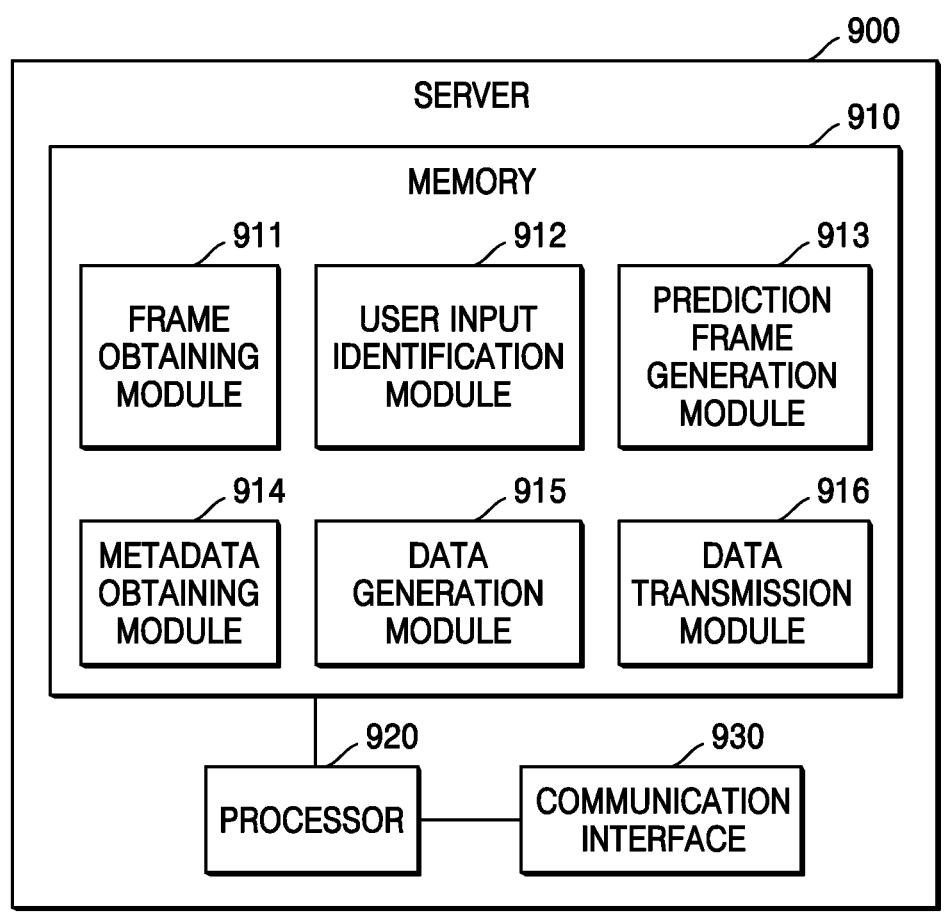
FIG. 9 is a block diagram of a server according to an embodiment of the disclosure.

FIG. 9 is a block diagram of a server according to an embodiment of the disclosure.

Referring to FIG. 9, the server 900 according to an embodiment of the disclosure may include a memory 910, a processor 920, and a communication interface 930.

The memory 910 may store a program to be executed by the processor 920 to be described later, and may store data input to the server 900 or output from the server 900.

The memory 910 may include at least one type of storage medium from among a flash memory type, a hard disk type, a multimedia card micro type, a card type memory (e.g., SD or XD memory, etc.), random access memory (RAM), static random access memory (SRAM), read-only memory (ROM), electrically erasable programmable read-only memory (EEPROM), programmable read-only memory (PROM), magnetic memory, a magnetic disk, or an optical disk.

Programs stored in the memory 910 may be classified into a plurality of modules according to their functions. For example, a frame obtaining module 911, a user input identification module 912, a prediction frame generation module 913, a metadata obtaining module 914, a data generation module 915, and a data transmission module 916 may be included.

The processor 920 controls the overall operation of the server 900. For example, the processor 920 may control the overall operations of the memory 910 and the communication interface 930 by executing the programs stored in the memory 910.

The processor 920 may obtain N frames of image content currently being executed by the electronic device 1100 by executing the frame obtaining module 911 stored in the memory 910.

By executing the user input identification module 912 stored in the memory 910, the processor 920 may identify a plurality of user inputs that may be input by a user in regard to the N frames.

The processor 920 may generate K prediction frame sets corresponding to a plurality of user inputs by executing the prediction frame generation module 913 stored in the memory 910.

The processor 920 may obtain metadata from the N frames and K prediction frame sets by executing the metadata obtaining module 914 stored in the memory 910.

By executing the data generation module 915 stored in the memory 910, the processor 920 may generate streaming data of image content to be provided to the electronic device 1100, based on at least one of the K prediction frame sets or the metadata.

The processor 920 may transmit the streaming data generated through the communication interface 930 to another device, for example the electronic device 1100 described below with respect to FIG. 11, by executing the data transmission module 916 stored in the memory 910.

The communication interface 930 refers to elements which may transmit the streaming data generated by the server 900 to the electronic device 1100. Also, the communication interface 930 refers to a e elements which may receive, from the server 900, information about a user input received by the electronic device 1100 from the user.

Figure 10:
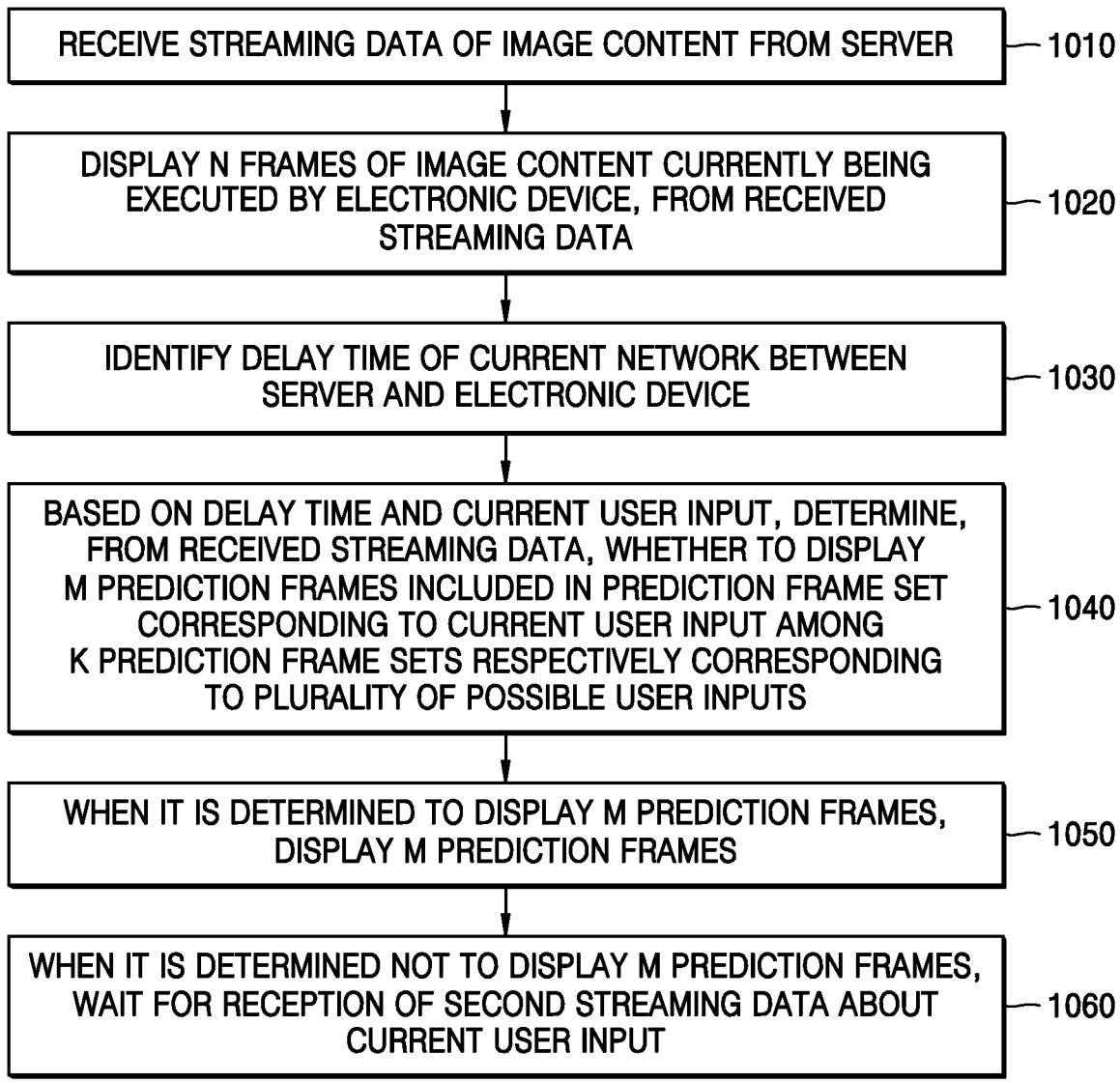
FIG. 10 is a flowchart of a method of receiving, by an electronic device, streaming data of image content from a server, according to an embodiment of the disclosure.

FIG. 10 is a flowchart of a method of receiving, by an electronic device according to an embodiment of the disclosure, streaming data of image content from a server.

Referring to FIG. 10, at operation 1010, the electronic device 1100 receives streaming data of image content from the server 900.

At operation 1020, the electronic device 1100 displays N frames of image content currently being executed by the electronic device 1100 from the received streaming data.

At operation 1030, the electronic device 1100 identifies a delay time of a current network between the server 900 and the electronic device 1100.

At operation 1040, based on the delay time and a current user input, the electronic device 1100 determines, from the received streaming data, whether to display M prediction frames included in a prediction frame set corresponding to the current user input among K prediction frame sets corresponding to a plurality of possible user inputs.

At operation 1050, when it is determined to display the M prediction frames, the electronic device 1100 displays the M prediction frames.

According to an embodiment of the disclosure, when the second streaming data is received while displaying the M prediction frames, the display of the M prediction frames may be stopped, and frames of the received second streaming data may be displayed.

According to an embodiment of the disclosure, when the received second streaming data has a relatively low resolution, the image content may be restored to a high resolution based on the second streaming data and the streaming data.

According to an embodiment of the disclosure, when the delay time is greater than or equal to a preset period of time, a frame predicted based on already received second streaming data and the streaming data may be displayed.

At operation 1060, when it is determined not to display the M prediction frames, the electronic device 1100 waits for reception of the second streaming data about the current user input.

According to an embodiment of the disclosure, the second streaming data may be streaming data generated by the server 900 in response to the current user input that is input to the electronic device 1100.

Figure 11:
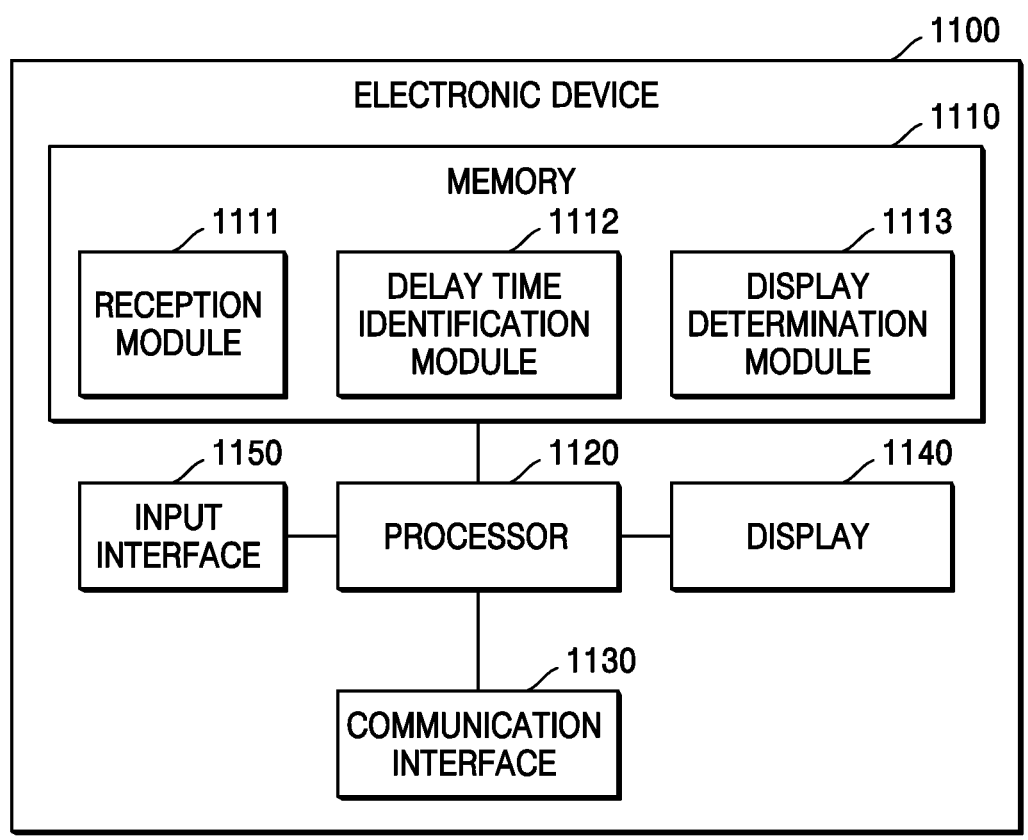
FIG. 11 is a block diagram illustrating an electronic device according to an embodiment of the disclosure.

FIG. 11 is a block diagram illustrating an electronic device according to an embodiment of the disclosure.

Referring to FIG. 11, the electronic device 1100 according to an embodiment of the disclosure may include a memory 1110, a processor 1120, a communication interface 1130, a display 1140, and an input interface 1150.

The memory 1110 may store a program to be executed by the processor 1120 to be described later, and may store data input to the electronic device 1100 or output from the electronic device 1100.

The memory 1110 may include at least one type of storage medium from among a flash memory type, a hard disk type, a multimedia card micro type, a card type memory (e.g., SD or XD memory, etc.), random access memory (RAM), static random access memory (SRAM), read-only memory (ROM), electrically erasable programmable read-only memory (EEPROM), programmable read-only memory (PROM), magnetic memory, a magnetic disk, or an optical disk.

Programs stored in the memory 1110 may be classified into a plurality of modules according to their functions, and may include, for example, a reception module 1111, a delay time identification module 1112, and a display determination module 1113.

The processor 1120 may control the overall operation of the electronic device 1100. For example, the processor 1120 may control the overall operations of the memory 1110, the communication interface 1130, the display 1140, and the input interface 1150 by executing the programs stored in the memory 1110.

The processor 1120 may receive streaming data of image content from the server 900 through the communication interface 1130 by executing the reception module 1111 stored in the memory 1110.

The processor 1120 may identify a delay time of a current network between the server 900 and the electronic device 1100 by executing the delay time identification module 1112 stored in the memory 1110.

By executing the display determination module 1113 stored in the memory 1110, the processor 1120 may restore and display N frames of image content currently being executed by the electronic device 1100 from the received streaming data. Based on the delay time and a current user input, the electronic device 150 determines, from the received streaming data, whether to display M prediction frames included in a prediction frame set corresponding to the current user input among K prediction frame sets corresponding to a plurality of possible user inputs. When it is determined to display the M prediction frames, the M prediction frames are restored and displayed on the display 1140, and when it is determined not to display the M prediction frames, reception of second streaming data about the current user input may be awaited.

The communication interface 1130 may receive the streaming data generated by the server 900 from the electronic device 1100. Also, the communication interface 1130 may transmit, to the server 900, information about a user input that is input to the electronic device 1100 by the user.

The display 1140 displays image content obtained by restoring the streaming data received by the electronic device 1100 from the server 900.

The input interface 1150 may be used by a user to input data for controlling the electronic device 1100, and may receive a user input for image content. For example, the input interface 1150 may include at least one of a key pad, a dome switch, a touch pad (a contact capacitive type, a pressure resistance film type, an infrared sensing type, a surface ultrasonic conduction type, an integral-type tension measurement type, a piezo-effect type, etc.), a jog wheel, or a jog switch, but is not limited thereto.

In accordance with an embodiment of the disclosure, a method, performed by a server, of streaming image content, includes obtaining one or more frames of the image content which is currently being executed by an electronic device; identifying a plurality of user inputs that are inputtable by a user, corresponding to the one or more frames; generating a plurality of prediction frame sets respectively corresponding to the plurality of user inputs, wherein each prediction frame set of the plurality of prediction frame sets includes a plurality of prediction frames to be displayed after the one or more frames; obtaining metadata from the one or more frames and the plurality of prediction frame sets; generating streaming data of the image content to be provided to the electronic device, based on at least one of the plurality of prediction frame sets or the metadata; and transmitting the generated streaming data to the electronic device.

In accordance with an embodiment of the disclosure, the plurality of prediction frames may be predicted for display after the one or more frames according to a user input related to the one or more frames.

In accordance with an embodiment of the disclosure, the plurality of prediction frames may be generated using an artificial intelligence model trained to generate predicted frames for display after the one or more frames, according to the one or more frames and a type of a user input.

In accordance with an embodiment of the disclosure, the one or more frames may correspond to an image of the image content which is currently displayed on a screen of the electronic device.

In accordance with an embodiment of the disclosure, a number of the plurality of prediction frames in the each prediction frame set may be determined according to a delay time of a current network between the server and the electronic device.

In accordance with an embodiment of the disclosure, the metadata may include information about at least one of an object, a shape, or an attribute in a frame.

In accordance with an embodiment of the disclosure, the generating the streaming data may include downscaling a prediction frame of the plurality of prediction frames; and generating the streaming data by using the downscaled prediction frame.

In accordance with an embodiment of the disclosure, only a portion of the prediction frame may be downscaled.

In accordance with an embodiment of the disclosure, the generating the streaming data may include marking object information corresponding to objects in a prediction frame of the plurality of prediction frames.

In accordance with an embodiment of the disclosure, the generating the streaming data may include generating the streaming data by using some prediction frames of the plurality of prediction frames.

In accordance with an embodiment of the disclosure, a method, performed by an electronic device, of streaming image content, includes receiving streaming data of the image content from a server; displaying, from the received streaming data, one or more frames of the image content which is currently being executed by the electronic device; identifying a delay time of a current network between the server and the electronic device; based on the delay time and a current user input, determining, from the received streaming data, whether to display a plurality of prediction frames included in a prediction frame set corresponding to the current user input from among a plurality of prediction frame sets respectively corresponding to a plurality of possible user inputs; based on determining to display the plurality of prediction frames, displaying the plurality of prediction frames; and based on determining not to display the plurality of prediction frames, waiting for reception of second streaming data corresponding the current user input.

In accordance with an embodiment of the disclosure, the method may further include, based on the second streaming data being received while displaying the plurality of prediction frames, stopping the displaying of the plurality of prediction frames, and displaying frames of the received second streaming data.

In accordance with an embodiment of the disclosure, based on the received second streaming data having a first resolution, the image content may be upscaled to a second resolution higher than the first resolution, based on the second streaming data and the streaming data.

In accordance with an embodiment of the disclosure, based on the delay time being greater than or equal to a predetermined period of time, frames which are predicted based on the streaming data and received second streaming data may be displayed.

In accordance with an embodiment of the disclosure, a server includes a communication interface configured to transmit streaming data of image content to an electronic device; and at least one processor. The at least one processor may obtain one or more frames of the image content which is currently being executed by the electronic device. The at least one processor may identify a plurality of user inputs that are inputtable by a user, corresponding to the one or more frames. The at least one processor may generate a plurality of prediction frame sets respectively corresponding to the plurality of user inputs, wherein each prediction frame set of the plurality of prediction frame sets includes a plurality of prediction frames to be displayed after the one or more frames. The at least one processor may obtain metadata from the one or more frames and the plurality of prediction frame sets. The at least one processor may generate streaming data of the image content to be provided to the electronic device, based on at least one of the plurality of prediction frame sets or the metadata. The at least one processor may transmit the generated streaming data to the electronic device.

In accordance with an embodiment of the disclosure, an electronic device includes a communication interface configured to receive streaming data of image content from a server; a display; and at least one processor. The at least one processor may receive streaming data of the image content from the server. The at least one processor may restore, from the received streaming data, one or more frames of the image content which is currently being executed by the electronic device, and display the one or more frames. The at least one processor may identify a delay time of a current network between the server and the electronic device. The at least one processor may based on the delay time and a current user input, determine, from the received streaming data, whether to display plurality of prediction frames included in a prediction frame set corresponding to the current user input from among plurality of prediction frame sets respectively corresponding to a plurality of possible user inputs. The at least one processor may based on determining to display the plurality of prediction frames, restore the plurality of prediction frames and display the plurality of prediction frames on the display. The at least one processor may based on determining not to display the plurality of prediction frames, wait for reception of second streaming data corresponding to the current user input.

According to an embodiment of the disclosure is to, for prevention of a streaming delay in streaming of image content between a server and an electronic device, generate, by the server, prediction frames corresponding to possible user inputs about image content that is currently executed, obtain metadata based on frames regarding the currently executed image content and the prediction frames, transmit streaming data generated using an artificial intelligence model based on at least one of the prediction frames or the metadata, restore, by the electronic device, the received streaming data by using the artificial intelligence model, and determine whether to display restored prediction frames based on a delay time between the server and the electronic device and a current user input, and display the prediction frames, thereby efficiently converting streaming data, and displaying the image content by quickly responding to a user input.

According to an embodiments, by displaying image content in real time based on one or more frames of the image content which is currently being executed by an electronic device, a plurality of prediction frame sets respectively corresponding to a plurality of possible user inputs and metadata, an operation of a user (input) may be immediately answered to even when a network delay occurs, thereby improving user experience for the image content and seamlessly displaying the image content on the electronic device.

Also, by using metadata, a usage amount of bandwidth of an image content streaming service may be remarkably reduced.

A machine-readable storage medium may be provided in a form of a non-transitory storage medium. The term 'non-transitory storage medium' may mean a tangible device without including a signal, e.g., electromagnetic waves, and may not distinguish between storing data in the storage medium semi-permanently and temporarily. For example, the 'non-transitory storage medium' may include a buffer that temporarily stores data.

In an embodiment of the disclosure, the aforementioned method according to the various embodiments of the disclosure may be provided in a computer program product. Computer program products may be traded between sellers and buyers as commodities. The computer program product may be distributed in a form of machine-readable storage medium (for example, a compact disc read-only memory (CD-ROM)), or distributed (for example, downloaded or uploaded) through an application store or directly or online between two user devices (for example, smart phones). In the case of online distribution, at least part of the computer program product (e.g., a downloadable app) may be at least temporarily stored or arbitrarily created in a storage medium that may be readable to a device such as a memory of a server of the manufacturer, a server of the application store, or a relay server.

The invention claimed is:

1. A method, performed by a server, of streaming image content, the method comprising:
   obtaining one or more frames of the image content which is currently being executed by an electronic device;
   identifying a plurality of user inputs that are inputtable by a user, corresponding to the one or more frames;
   generating a plurality of prediction frame sets respectively corresponding to the plurality of user inputs, wherein each prediction frame set of the plurality of prediction frame sets includes a plurality of prediction frames to be displayed after the one or more frames, and the plurality of prediction frames are generated using at least one artificial intelligence model;
   downscaling the plurality of prediction frame sets;
   obtaining metadata from the one or more frames and the downscaled plurality of prediction frame sets;
   generating streaming data of the image content to be provided to the electronic device, based on at least one of the downscaled plurality of prediction frame sets or the metadata; and
   transmitting the generated streaming data to the electronic device.

2. The method of claim 1, wherein the plurality of prediction frames are predicted for display after the one or more frames according to a user input related to the one or more frames.

3. The method of claim 1, wherein the at least one artificial intelligence model is trained to generate predicted frames for display after the one or more frames, according to the one or more frames and a type of a user input.

4. The method of claim 1, wherein the one or more frames correspond to an image of the image content which is currently displayed on a screen of the electronic device.

5. The method of claim 1, wherein a number of the plurality of prediction frames in the each prediction frame set is determined according to a delay time of a current network between the server and the electronic device.

6. The method of claim 1, wherein the metadata comprises information about at least one of an object, a shape, or an attribute in a frame.

7. The method of claim 1, wherein the generating the streaming data comprises:
   downscaling a prediction frame of the plurality of prediction frames; and
   generating the streaming data by using the downscaled prediction frame.

8. The method of claim 7, wherein only a portion of the prediction frame is downscaled.

9. The method of claim 1, wherein the generating the streaming data comprises marking object information corresponding to objects in a prediction frame of the plurality of prediction frames.

10. The method of claim 1, wherein the generating the streaming data comprises generating the streaming data by using some prediction frames of the plurality of prediction frames.

11. The method of claim 1, wherein the at least one artificial intelligence model comprises at least one from among a deep neural network (DNN) and a generative adversarial network (GAN).

12. A method, performed by an electronic device, of streaming image content, the method comprising:
   receiving streaming data of the image content from a server;
   displaying, from the received streaming data, one or more frames of the image content which is currently being executed by the electronic device;
   identifying a delay time of a current network between the server and the electronic device;
   based on the delay time and a current user input, determining, from the received streaming data, whether to display a plurality of prediction frames included in a prediction frame set corresponding to the current user input from among a plurality of prediction frame sets respectively corresponding to a plurality of possible user inputs, wherein the plurality of prediction frames are generated using an artificial intelligence model;
   based on determining to display the plurality of prediction frames, upscaling the plurality of prediction frames and displaying the upscaled plurality of prediction frames; and
   based on determining not to display the plurality of prediction frames, waiting for reception of second streaming data corresponding the current user input.

13. The method of claim 12, further comprising, based on the second streaming data being received while displaying the plurality of prediction frames, stopping the displaying of the plurality of prediction frames, and displaying frames of the received second streaming data.

14. The method of claim 13, wherein based on the received second streaming data having a first resolution, the image content is upscaled to a second resolution higher than the first resolution, based on the second streaming data and the streaming data.

15. The method of claim 13, wherein, based on the delay time being greater than or equal to a predetermined period of time, frames which are predicted based on the streaming data and received second streaming data are displayed.

16. A server comprising:
   a communication interface configured to transmit streaming data of image content to an electronic device; and
   at least one processor configured to:
      obtain one or more frames of the image content which is currently being executed by the electronic device;

identify a plurality of user inputs that are inputtable by a user, corresponding to the one or more frames;

generate a plurality of prediction frame sets respectively corresponding to the plurality of user inputs, wherein each prediction frame set of the plurality of prediction frame sets includes a plurality of prediction frames to be displayed after the one or more frames, and the plurality of prediction frames are generated using at least one artificial intelligence model;

downscale the plurality of prediction frame sets;

obtain metadata from the one or more frames and the downscaled plurality of prediction frame sets;

generate streaming data of the image content to be provided to the electronic device, based on at least one of the downscaled plurality of prediction frame sets or the metadata; and transmit the generated streaming data to the electronic device.

* * * * *